United States Patent
Shu et al.

(10) Patent No.: US 12,028,918 B2
(45) Date of Patent: Jul. 2, 2024

(54) SMS PROCESSING METHOD IN INTERNET OF THINGS, MOBILITY MANAGEMENT NETWORK ELEMENT, AND TERMINAL DEVICE

(71) Applicant: HUAWEI TECHNOLOGIES CO., LTD., Guangdong (CN)

(72) Inventors: Lin Shu, Shanghai (CN); Caijuan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/397,243

(22) Filed: Aug. 9, 2021

(65) Prior Publication Data

US 2021/0368573 A1 Nov. 25, 2021

Related U.S. Application Data

(63) Continuation of application No. 16/366,639, filed on Mar. 27, 2019, now Pat. No. 11,134,533, which is a
(Continued)

(30) Foreign Application Priority Data

Sep. 28, 2016 (CN) .......................... 201610859000.6

(51) Int. Cl.
*H04W 76/16* (2018.01)
*H04W 4/14* (2009.01)
(Continued)

(52) U.S. Cl.
CPC ............ *H04W 76/16* (2018.02); *H04W 4/14* (2013.01); *H04W 4/70* (2018.02); *H04W 40/248* (2013.01);
(Continued)

(58) Field of Classification Search
None
See application file for complete search history.

(56) References Cited

U.S. PATENT DOCUMENTS

2009/0305668 A1 12/2009 Ahn et al.
2010/0329243 A1 12/2010 Buckley et al.
(Continued)

FOREIGN PATENT DOCUMENTS

CN 102118733 7/2011
CN 103369480 10/2013
(Continued)

OTHER PUBLICATIONS

"Universal Mobile Telecommunications System (Umts); LTE; Non-Access-Stratum (NAS) protocol for Evolved Packet System (EPS); 3GPP TS 24.301 version 11.4.0 Release 11, Oct. 2012" (Year: 2012).*
(Continued)

*Primary Examiner* — Jenkey Van
(74) *Attorney, Agent, or Firm* — Fish & Richardson P.C.

(57) ABSTRACT

The present disclosure relates to example SMS processing methods in an Internet of Things, mobility management network elements, and terminal devices, to provide an SMS service for an Internet of Things terminal device. One example method includes receiving, by a mobility management network element in a packet switched (PS) domain, a non-combined registration request from a terminal device, where the non-combined registration request carries SMS only indication information. When determining that the mobility management network element in the PS domain cannot transfer an SMS for the terminal device through the PS domain, the mobility management network element in the PS domain sends a location update request to a mobility management network element in a circuit switched (CS)
(Continued)

domain The location update request is used to implement registration of the terminal device with the CS domain.

19 Claims, 8 Drawing Sheets

Related U.S. Application Data continuation of application No. PCT/CN2017/096634, filed on Aug. 9, 2017.

(51) Int. Cl.
*H04W 4/70* (2018.01)
*H04W 40/24* (2009.01)
*H04W 60/00* (2009.01)
*H04W 64/00* (2009.01)
*H04W 68/06* (2009.01)

(52) U.S. Cl.
CPC ......... *H04W 60/00* (2013.01); *H04W 60/005* (2013.01); *H04W 64/003* (2013.01); *H04W 68/06* (2013.01); *H04W 64/00* (2013.01)

(56) References Cited

U.S. PATENT DOCUMENTS

| | | | |
|---|---|---|---|
| 2013/0143610 A1* | 6/2013 | Jeong | H04W 8/02 455/466 |
| 2013/0150031 A1* | 6/2013 | Hedman | H04W 8/06 455/433 |
| 2013/0268604 A1* | 10/2013 | Gupta | H04N 21/643 709/206 |
| 2015/0011250 A1 | 1/2015 | Xu | |
| 2015/0109966 A1* | 4/2015 | Hong | H04M 3/527 370/259 |
| 2015/0156622 A1 | 6/2015 | Shi et al. | |
| 2015/0341889 A1 | 11/2015 | Starsinic et al. | |
| 2018/0020417 A1* | 1/2018 | Catovic | H04W 48/16 |
| 2019/0037441 A1* | 1/2019 | Liu | H04W 28/06 |
| 2019/0116531 A1 | 4/2019 | Ryu et al. | |

FOREIGN PATENT DOCUMENTS

| | | |
|---|---|---|
| CN | 103369481 | 10/2013 |
| CN | 103581871 | 2/2014 |
| JP | 2015501105 | 1/2015 |

OTHER PUBLICATIONS

3GPP TS 24.301 V14.0.1 (Jun. 2016), 3rd Generation Partnership Project;Technical Specification Group Core Network and Terminals;Non-Access-Stratum (NAS) protocol for Evolved Packet System (EPS); Stage 3(Release 14), total 237 pages.
3GPP TS 29.118 V13.3.0 (Mar. 2016), 3rd Generation Partnership Project;Technical Specification Group Core Network and Terminals;Mobility Management Entity (MME)—Visitor Location Register (VLR)SGs interface specification(Release 13), Mar. 2016. total 73 pages.
C1-160103—Alcatel-Lucent et al., "EPS Attach for CIoT EPS optimization," 3GPP TSG-CT WG1 Meeting #95bis, Nashville (TN), USA, Jan. 11-15, 2016, 26 pages.
C1-161533—Alcatel-Lucent et al., "SMS with no combined attach for CIoT device," 3GPP TSG-CT WG1 Meeting #96, Jeju Island, Korea, Feb. 15-19, 2016, 2 pages.
"Catovic et al., ""Registration Reject Due to CIoT Feature Incompatibility"", U.S. Appl. No. 62/363,181, filed Jul. 15, 2016 (Year: 2016)".
Extended European Search Report issued in European Application No. 17854585.1 dated May 2, 2019, 10 pages.
Office Action issued in Japanese Application No. 2018-564347 dated Nov. 12, 2019, 6 pages (with English translation).
S2-160836—Alcatel-lucent et al., "Introduction of attach procedure changes for CIoT EPS optimization," 3GPP TSG SA WG2 Meeting #113, St. Kitts, Jan. 25-29, 2016, 15 pages.
S2-161348—Ericsson, "SMS support with EPS attach and TAU," SA WG2 Meeting #113AH, Sophia Antipolis, France, Feb. 23-26, 2016, 10 pages.

* cited by examiner

SMS PROCESSING METHOD IN INTERNET OF THINGS, MOBILITY MANAGEMENT NETWORK ELEMENT, AND TERMINAL DEVICE

CROSS-REFERENCE TO RELATED APPLICATIONS

This application is continuation of U.S. patent application Ser. No. 16/366,639, filed Mar. 27, 2019, which is a continuation of International Application No. PCT/CN2017/096634, filed on Aug. 9, 2017, which claims priority to Chinese Patent Application No. 201610859000.6, filed on Sep. 28, 2016. All of the afore-mentioned patent applications are hereby incorporated by reference in their entireties.

TECHNICAL FIELD

The present disclosure relates to the field of Internet of Things, and more specifically, to an SMS processing method in an Internet of Things, a mobility management network element, and a terminal device.

BACKGROUND

With evolution of wireless communications technologies and gradual penetration of the mobile broadband Internet into different vertical industries, more and more conventional terminal devices need to access the mobile Internet to implement interworking, and provide more convenient and different services for respective vertical industries, so that a requirement for Internet of everything is formed, and then an Internet of Things (IoT) emerges. As a branch of the Internet of Things, a Cellular Internet of Things (CIoT) is an Internet of Things that implements access of an Internet of Things terminal to a mobile communications network by using a Narrowband Internet of Things (NB-IoT) access technology. Because the Internet of Things terminal has application features of simple function, low power consumption, and non-frequent user data transfer, many functional characteristics defined in an existing evolved packet system (EPS) are extremely complex and unnecessary for a CIoT application scenario. Therefore, an existing network function of the EPS is optimized in the industry.

For example, a conventional terminal device needs to initiate a combined registration procedure to implement combined registration of the terminal device with a circuit switched (CS) domain and a packet switched (PS) domain, so as to perform SMS transfer. This is optimized in the 3rd Generation Partnership Project (3GPP) Release 13, and an SMS transfer without combined procedure feature is introduced. To be specific, the Internet of Things terminal can obtain an SMS service provided that the Internet of Things terminal initiates a non-combined registration procedure to implement registration with the PS domain.

In the prior art, SMS transfer on a network side supports two paths. For one path, an SMS is transferred through an SGs interface in the CS domain (SMS over SGs). For the other path, an SMS is transferred through an SGd interface in the PS domain (SMS in MME). SMS over SGs is a mature SMS transfer mechanism. However, an SMS transfer mechanism of SMS in MME is newly introduced in the 3GPP Release (Release) 11. If the network side needs to support the path of transferring the SMS in the PS domain, an SMS protocol stack needs to be further implemented. However, SMS in MME is rarely deployed on the network side of an operator in a live network.

Therefore, how to provide the SMS service for the Internet of Things terminal device in an operator network in which SMS in MME is not deployed becomes an urgent problem to be resolved.

SUMMARY

This application provides an SMS processing method in an Internet of Things, a mobility management network element, and a terminal device, to provide an SMS service for an Internet of Things terminal device.

According to a first aspect, this application provides an SMS processing method in an Internet of Things. The method includes: receiving, by a mobility management network element in a packet switched PS domain, a non-combined registration request sent by a terminal device, where the non-combined registration request is used to implement registration of the terminal device with the PS domain, and the non-combined registration request carries SMS only indication information; and when determining that the mobility management network element in the PS domain cannot transfer an SMS for the terminal device through the PS domain, sending, by the management network element in the PS domain mobility, a location update request to a mobility management network element in a circuit switched CS domain, where the location update request is used to implement registration of the terminal device with the CS domain.

The SMS only indication information is used to indicate that the terminal device requests to obtain an SMS service. In other words, the SMS only indication information is used to indicate that the terminal device needs to transfer an SMS.

It should be noted that the PS domain mobility management network element may be a mobility management network element in an EPS network, for example, may be a mobility management entity (MME). Alternatively, the mobility management network element in the PS domain may be a network element in a core network in a future network (for example, 5G).

It should be further noted that the terminal device in this embodiment of the present disclosure is an Internet of Things terminal device. For ease of description, the Internet of Things terminal device is referred to as a terminal device below.

It should be understood that the Internet of Things terminal device is a terminal device that can access an Internet of Things core network (for example, an EPS) by using an Internet of Things air interface access technology (for example, a Narrowband Internet of Things NB-IoT), and provide a user with an Internet of Things service (for example, a service such as smart metering, smart household, and intelligent transportation). Internet of Things terminal devices are widely distributed in the Internet of Things.

In this embodiment of the present disclosure, when SMS in MME is not deployed at the PS domain management network element, if the PS domain management network element receives the non-combined registration request sent by the terminal device, the PS domain management network element sends the location update request to the CS domain mobility management network element, to implement the registration of the terminal device with the CS domain. In other words, the PS domain management network element performs a conversion from a non-combined registration procedure to a combined registration procedure. The SMS service can be provided for the Internet of Things terminal device in a case in which the Internet of Things terminal device does not know the conversion from the non-combined registration procedure to the combined registration procedure.

In a possible implementation, the method further includes: receiving, by the mobility management network element in the PS domain, a location update accept message sent by the mobility management network element in the CS domain, where the location update accept message is used to indicate that the mobility management network element in the CS domain accepts the registration of the terminal device with the CS domain.

In this embodiment, after the mobility management network element in the PS domain sends the location update request to the mobility management network element in the CS domain, if the mobility management network element in the CS domain can accept registration of UE with the CS domain, the mobility management network element in the CS domain sends the location update accept message to the mobility management network element in the PS domain. In this way, the mobility management network element in the PS domain learns that the UE successfully registers with the CS domain, so as to provide the SMS service for the terminal device through the CS domain.

In a possible implementation, the location update message includes a CS domain mobility management parameter, and the method further includes: storing, by the mobility management network element in the PS domain, the CS domain mobility management parameter, so that when the mobility management network element in the PS domain needs to implement the registration of the terminal device with the CS domain again, the CS domain mobility management parameter is used to implement the registration of the terminal device with the CS domain.

It should be understood that when accepting the registration of the terminal device with the CS domain, the mobility management network element in the CS domain may add the CS domain mobility management parameter to the location update message sent to the PS domain management network element. The PS domain management network element stores the CS domain mobility management parameter. In this way, when the PS domain management network element needs to implement the registration of the terminal device with the CS domain next time, the PS domain management network element may directly use the CS domain mobility management parameter to perform the registration of the terminal device with the CS domain, instead of re-initiating a complete CS domain registration procedure, so as to reduce signaling overheads.

It should be noted that in this embodiment, the PS domain management network element receives and stores the CS domain mobility management parameter sent by the mobility management network element in the CS domain. However, the PS domain management network element does not send the CS domain mobility management parameter to the terminal device. Therefore, the terminal device does not know that a network side performs the conversion from the non-combined registration procedure to the combined registration procedure.

In a possible implementation, the method further includes: receiving, by the mobility management network element in the PS domain, a location update reject message sent by the mobility management network element in the CS domain, where the location update reject message is used to indicate that the mobility management network element in the CS domain rejects the registration of the terminal device with the CS domain; and sending, by the mobility management network element in the PS domain, first indication information to the terminal device, where the first indication information is used to indicate that the mobility management network element in the PS domain cannot provide an SMS service for the terminal device.

When the mobility management network element in the CS domain does not accept the registration of the terminal device with the CS domain (for example, due to CS domain congestion control, CS domain network side fault, and the like), the mobility management network element in the CS domain sends the location update reject message to the mobility management network element in the PS domain. The mobility management network element in the PS domain learns, based on the location update reject message, that the registration of the terminal device with the CS domain fails. In other words, the network side cannot transfer the SMS for the UE through the CS domain. In addition, because SMS in MME is not deployed at the mobility management network element in the PS domain, in other words, the SMS cannot be transferred for the UE through the PS domain, the mobility management network element in the PS domain notifies the UE that the network side cannot provide the SMS service. In this way, the UE can optimize a behavior of the UE (for example, re-initiate a non-combined registration request, or try to obtain the SMS service at another location or in another network) to obtain the SMS service again. Compared with a prior-art mechanism that the network side cannot notify the UE that the network side cannot provide the SMS service, the technical solution provided in this embodiment may improve SMS service experience of a user.

According to a second aspect, this application provides an SMS processing method in an Internet of Things. The method includes: sending, by a terminal device, a non-combined registration request to a mobility management network element in a packet switched PS domain, where the non-combined registration request is used to implement registration of the terminal device with the PS domain, and the non-combined registration request carries SMS only indication information; and receiving, by the terminal device, first indication information sent by the mobility management network element in the PS domain, where the first indication information is used to indicate that the mobility management network element in the PS domain cannot provide an SMS service for the terminal device, and the first indication information is sent to the terminal device when the mobility management network element in the PS domain determines, after receiving the non-combined registration request sent by the terminal device, that the mobility management network element in the PS domain cannot transfer an SMS for the terminal device through the PS domain.

It should be understood that the SMS only indication information is used to indicate that the terminal device requests to obtain the SMS service. In other words, the SMS only indication information is used to indicate that the terminal device needs to transfer an SMS.

In this embodiment of the present disclosure, the PS domain management network element may be a mobility management network element in an EPS network, for example, may be an MME Alternatively, the mobility management network element in the PS domain may be a network element in a core network in a future network (for example, 5G).

When SMS in MME is not deployed at the PS domain management network element, if the PS domain management network element receives the non-combined registration request sent by the terminal, the PS domain management network element sends a location update request to a CS domain management network element, to implement registration of the terminal device with a CS domain. In other words, the PS domain management network element performs a conversion from a non-combined registration procedure to a combined registration procedure, and provides, in a case in which the terminal device does not know the conversion from the non-combined registration procedure to the combined registration procedure, the SMS service for the terminal device that supports an SMS transfer without combined procedure feature.

In a possible implementation, the first indication information is sent to the terminal device when the mobility management network element in the PS domain determines, after receiving the non-combined registration request sent by the terminal device, that the mobility management network element in the PS domain cannot transfer the SMS for the terminal device through the PS domain and a mobility management network element in a circuit switched CS domain rejects registration of the terminal device with the CS domain.

In a possible implementation, the method further includes: starting, by the terminal device, a timer, and resending a non-combined registration request to the mobility management network element in the PS domain when the timer expires, where the non-combined registration request carries the SMS only indication information; or performing, by the terminal device, any one of the following actions to re-request to obtain the SMS service: tracking area reselection, location area reselection, or public land mobile network PLMN selection: or sending, by the terminal device, a combined registration request to the mobility management network element in the PS domain, where the combined registration request carries the SMS only indication information.

Further, when learning that a network side cannot provide the SMS service, the UE may optimize a behavior of obtaining the SMS service by the UE (for example, re-initiate the non-combined registration request, or try to obtain the SMS service at another location or in another network), to obtain the SMS service again. Compared with a prior-art mechanism that the network side cannot notify the UE that the network side cannot provide the SMS service, the technical solution provided in this embodiment may improve SMS service experience of a user.

According to a third aspect, this application provides an SMS processing method in an Internet of Things. The method includes: receiving, by a mobility management network element in a packet switched PS domain, a non-combined registration request sent by a terminal device, where the non-combined registration request is used to implement registration of the terminal device with a packet switched PS domain, and the non-combined registration request carries SMS only indication information; and sending, by the mobility management network element in the PS domain, first indication information to the terminal device, where the first indication information is used to indicate that the mobility management network element in the PS domain cannot provide an SMS service for the terminal device.

It should be understood that the SMS only indication information is used to indicate that the terminal device requests to obtain the SMS service. In other words, the SMS only indication information is used to indicate that the terminal device needs to transfer an SMS.

In this embodiment of the present disclosure, when SMS in MME is not deployed at the PS domain management network element, the PS domain management network element receives the non-combined registration request sent by the terminal. If the PS domain management network element does not support an SMS transfer without combined procedure feature, the PS domain management network element may directly notify the terminal of information that "a network side does not support the SMS transfer without combined procedure feature". Compared with the prior art in which UE cannot learn a reason that the network side cannot provide the SMS service, the technical solution provided in this embodiment may improve SMS service experience of a user. In addition, a behavior of obtaining the SMS service by the UE may be optimized, so that the UE quickly obtains the SMS service.

In a possible implementation, that the mobility management network element in the PS domain determines that the mobility management network element in the PS domain cannot provide an SMS service for the terminal device includes:

the mobility management network element in the PS domain does not support SMS transfer without combined procedure, where the first indication information is specifically used to indicate that the mobility management network element in the PS domain does not support SMS transfer without combined procedure.

In a possible implementation, that the mobility management network element in the PS domain determines that the mobility management network element in the PS domain cannot provide an SMS service for the terminal device includes:

the mobility management network element in the PS domain supports SMS transfer without combined procedure, but cannot transfer an SMS for the terminal device through the PS domain, where the first indication information is specifically used to indicate that the mobility management network element in the PS domain cannot transfer the SMS for the terminal device through the PS domain.

According to a fourth aspect, this application provides an SMS processing method in an Internet of Things. The method includes: sending, by a terminal device, a non-combined registration request to a mobility management network element in a packet switched PS domain, where the non-combined registration request is used to implement registration of the terminal device with the PS domain, and the non-combined registration request carries SMS only indication information: and receiving, by the terminal device, first indication information sent by the mobility management network element in the PS domain, where the first indication information is used to indicate that the mobility management network element in the PS domain does not support SMS transfer without combined procedure, and the first indication information is sent to the terminal device when the mobility management network element in the PS domain determines, after receiving the non-combined registration request sent by the terminal device, that the mobility management network element in the PS domain does not support SMS transfer without combined procedure.

It should be understood that the SMS only indication information is used to indicate that the terminal device requests to obtain an SMS service. In other words, the SMS only indication information is used to indicate that the terminal device needs to transfer an SMS.

In this embodiment of the present disclosure, the terminal device sends the non-combined registration request to the PS domain management network element to obtain the SMS service. If the mobility management network element in the PS domain does not support an SMS transfer without combined procedure feature, the PS domain management network element may directly notify the terminal of information that "a network side does not support the SMS transfer without combined procedure feature", so that UE optimizes a behavior of obtaining the SMS service. Compared with the prior art in which the UE cannot learn a reason that the network side cannot provide the SMS service, the technical solution provided in this embodiment may improve SMS service experience of a user.

In a possible implementation, the method further includes: sending, by the terminal device, a combined registration request to the mobility management network element in the PS domain, where the combined registration request carries the SMS only indication information; or performing, by the terminal device, any one of the following actions to re-request to obtain the SMS service: tracking area reselection, location area reselection, or public land mobile network PLMN selection.

Further, the UE learns that the network side cannot provide the SMS service because the network side does not support the SMS transfer without combined procedure feature. In this case, if the UE needs to continue to obtain the SMS service, the UE initiates a combined registration procedure. Alternatively, the UE may try to re-request to obtain the SMS service at another location or in another network. It may be learned that in the technical solution provided in this embodiment of the present disclosure, when SMS in MME is not deployed at the PS domain management network element, the UE may learn that the SMS service on the network side is unavailable. This helps the UE optimize the behavior of obtaining the SMS, so that the UE can quickly obtain the SMS service.

According to a fifth aspect, this application provides a mobility management network element, configured to perform the method according to any one of the first aspect or the possible implementations of the first aspect. Specifically, the mobility management network element includes units configured to perform the method according to any one of the first aspect or the possible implementations of the first aspect.

According to a sixth aspect, this application provides a terminal device, configured to perform the method according to any one of the second aspect or the possible implementations of the second aspect. Specifically, the terminal device includes units configured to perform the method according to any one of the second aspect or the possible implementations of the second aspect.

According to a seventh aspect, this application provides a mobility management network element, configured to perform the method according to any one of the third aspect or the possible implementations of the third aspect. Specifically, the mobility management network element includes units configured to perform the method according to any one of the third aspect or the possible implementations of the third aspect.

According to an eighth aspect, this application provides a terminal device, configured to perform the method according to any one of the fourth aspect or the possible implementations of the fourth aspect. Specifically, the terminal device includes units configured to perform the method according to any one of the fourth aspect or the possible implementations of the fourth aspect.

According to a ninth aspect, this application provides a mobility management network element. The mobility management network element includes a processor and a memory. The memory is configured to store a computer program, and the processor is configured to invoke the computer program from the memory and run the computer program. When the program is run, the mobility management network element performs the method according to any one of the first aspect or the possible implementations of the first aspect.

According to a tenth aspect, this application provides a terminal device. The terminal device includes a processor and a memory. The memory is configured to store a computer program, and the processor is configured to invoke the computer program from the memory and run the computer program. When the program is run, the terminal device performs the method according to any one of the second aspect or the possible implementations of the second aspect.

According to an eleventh aspect, this application provides a mobility management network element. The mobility management network element includes a processor and a memory. The memory is configured to store a computer program, and the processor is configured to invoke the computer program from the memory and run the computer program. When the program is run, the mobility management network element performs the method according to any one of the third aspect or the possible implementations of the third aspect.

According to a twelfth aspect, this application provides a terminal device. The terminal device includes a processor and a memory. The memory is configured to store a computer program, and the processor is configured to invoke the computer program from the memory and run the computer program. When the program is run, the terminal device performs the method according to any one of the fourth aspect or the possible implementations of the fourth aspect.

According to a thirteenth aspect, this application provides a computer readable medium, configured to store a computer program, where the computer program includes an instruction used to perform the method according to any one of the first aspect or the possible implementations of the first aspect.

According to a fourteenth aspect, this application provides a computer readable medium, configured to store a computer program, where the computer program includes an instruction used to perform the method according to any one of the second aspect or the possible implementations of the second aspect.

According to a fifteenth aspect, this application provides a computer readable medium, configured to store a computer program, where the computer program includes an instruction used to perform the method according to the third aspect.

According to a sixteenth aspect, this application provides a computer readable medium, configured to store a computer program, where the computer program includes an instruction used to perform the method according to any one of the fourth aspect or the possible implementations of the fourth aspect.

According to the SMS processing method in the Internet of Things provided in the embodiments of the present disclosure, the mobility management network element performs the conversion from the non-combined registration procedure (also referred to as Normal Attach/TAU) to the combined registration procedure (Combined Attach/TAU), to provide the SMS service for the Internet of Things terminal device in a case in which the Internet of Things terminal device does not know the conversion from the non-combined registration procedure to the combined registration procedure.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

Figure 1:
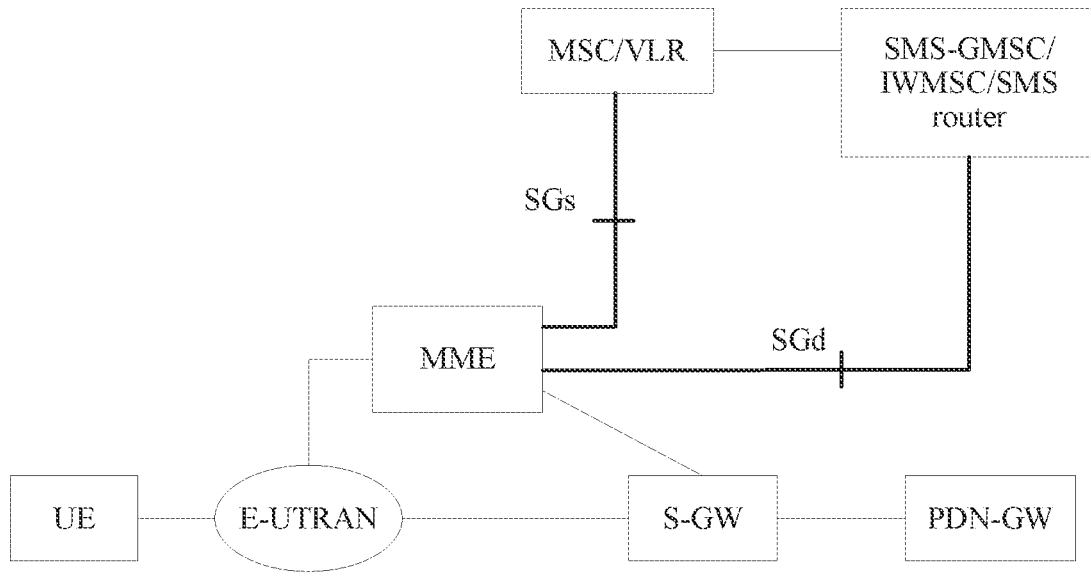
FIG. 1 shows a schematic diagram of a system architecture that is applicable to an embodiment of the present disclosure.

The following clearly describes the technical solutions in the embodiments of the present disclosure with reference to accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure may be applicable to different types of Internet of Things, such as a Cellular Internet of Things, or an Internet of Things in a future communications system (for example, 5G). This is not limited in the embodiments of the present disclosure.

First, related concepts in the embodiments of the present disclosure are described.

Non-combined registration indicates that only registration of a terminal device with a PS domain in a core network is implemented.

A non-combined registration procedure is a procedure initiated by a terminal device for implementing non-combined registration. The terminal device initiates the non-combined registration procedure by sending a non-combined registration request.

Combined registration indicates that registration of a terminal device with a circuit switched domain (a CS domain) and with a packet switched domain (a PS domain) in a core network are simultaneously implemented.

A combined registration procedure is a procedure initiated by a terminal device for implementing combined registration. The terminal device initiates the combined registration procedure by sending a combined registration request.

It should be noted that the non-combined registration request or the combined registration request in the following embodiments carries SMS only (SMS only) indication information. The non-combined registration request may also be referred to as a normal registration request, and may specifically include a non-combined attach (or normal attach) request, a non-combined tracking area update (non-combined TAU, or normal TAU) request, a non-combined routing area update (non-combined RAU, or normal RAU) request, a non-combined location area update (non-combined LAU, or normal LAU) request, and the like. The combined registration request may specifically include a combined attach request, a combined tracking area update (combined TAU) request, a combined routing area update (combined RAU) request, a combined location area update (combined LAU) request, and the like.

It should be noted that, that a mobility management network element in a packet switched PS domain cannot provide an SMS service for a terminal device in the following embodiments may specifically include: The mobility management network element in the PS domain cannot transfer an SMS to the terminal device through the PS domain. In other words, the mobility management network element in the PS domain cannot provide an SMS service via SMS in MME. Alternatively, the mobility management network element in the PS domain does not support SMS transfer without combined procedure. Alternatively, a mobility management network element in a circuit switched CS domain rejects registration of the terminal device with the CS domain.

FIG. 1 shows a schematic diagram of a system architecture that is applicable to an embodiment of the present disclosure. As shown in FIG. 1, an MME may provide two paths for transferring an SMS: (1) The MME transfers the SMS through an SGs interface in a CS domain (SMS over SGs), to be specific, uplink and downlink SMS transfer is implemented between the MME and an SMS-GMSC/IWMSC/SMS-Router through the SGs interface and a mobile service switching center (MSC)/a visitor location register (VLR). (2) The MME transfers the SMS through an SGd interface in a PS domain (SMS in MME), to be specific, uplink and downlink SMS transfer is directly implemented between the MME and an SMS-GMSC/IWMSC/SMS-Router through the SGd interface. Further, the MME may provide a PS domain data transfer service for UE by using a serving gateway (S-GW) and a packet data network (PDN) gateway (P-GW).

Figure 2:
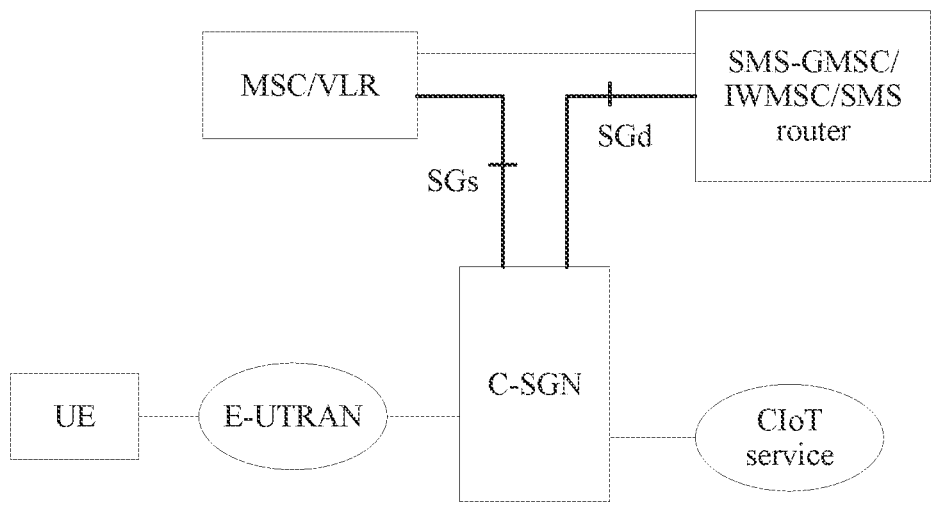
FIG. 2 shows a schematic diagram of another system architecture that is applicable to an embodiment of the present disclosure.

FIG. 2 shows a schematic diagram of another system architecture that is applicable to an embodiment of the present disclosure. As shown in FIG. 2, a cellular Internet of Things serving gateway node (C-SGN) is an integrated network element of an MME, a serving gateway (S-GW), and a packet data network (PDN) gateway (P-GW). Functions and external interfaces provided by the integrated network element C-SGN are consistent with those of the corresponding MME, S-GW, and PDN-GW in FIG. 1.

In this embodiment of the present disclosure, functions for implementing a PS domain management network element may be integrated into one network element, or may be separately configured on a plurality of different network elements. This is not limited in this embodiment of the present disclosure.

In addition, an SMS processing method in an Internet of Things provided in the embodiments of the present disclosure may be applied to an architecture in which a control plane is separated from a user plane in a future communications network (for example, 5G), an architecture of network slices in a network, and the like. This is not limited in the embodiments of the present disclosure.

Figure 3:
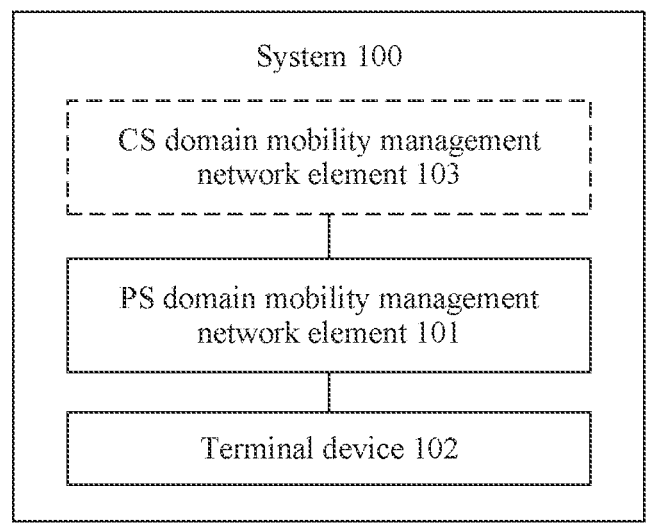
FIG. 3 shows a schematic diagram of an SMS processing system in an Internet of Things according to an embodiment of the present disclosure.

FIG. 3 shows a schematic diagram of an SMS processing system 100 in an Internet of Things according to an embodiment of the present disclosure. As shown in FIG. 3, the system 100 includes a mobility management network element in a PS domain 101 and a terminal device 102. Optionally, the system 100 further includes a mobility management network element in a CS domain 103.

The mobility management network element in the PS domain 101 in this embodiment of the present disclosure may be applicable to another mobility management network element in an existing 2G/3G network or an EPS, and a network element in a core network in a future communications system (for example, 5G).

The terminal device 102 in this embodiment of the present disclosure may also be referred to as user equipment (UE), a terminal, mobile user equipment, and the like. The terminal device 102 may communicate with one or more core networks through a radio access network (for example, Radio Access Network, RAN). The terminal device may be a mobile terminal such as a mobile phone (or referred to as a "cellular" phone) and a computer that has a mobile terminal. For example, the terminal device may be a portable, pocket-sized, handheld, computer built-in, or in-vehicle mobile apparatus, and the terminal device exchanges voice and/or data with the radio access network. In this embodiment of the present disclosure, the terminal device includes a mobile phone, an intelligent terminal (a wearable device, a smart watch, a smart meter, a smart water meter, and the like), a multimedia device, a streaming device, and a terminal device in MTC.

It should be further noted that the terminal device in this embodiment of the present disclosure is an Internet of Things terminal device. The Internet of Things terminal device has application features of low cost, simple function, low power consumption, and non-frequent user data transfer. For brevity, the Internet of Things terminal device is referred to as a terminal device in the following embodiments.

The mobility management network element in the PS domain 101 shown in FIG. 3 may be the MME shown in FIG. 1, or may be the C-SGN shown in FIG. 2. The terminal device 102 may be the UE shown in FIG. 1 and FIG. 2. Optionally, when the system 100 includes the mobility management network element in the CS domain, the mobility management network element in the CS domain may be the MSC/VLR shown in FIG. 1 and FIG. 2.

Figure 4:
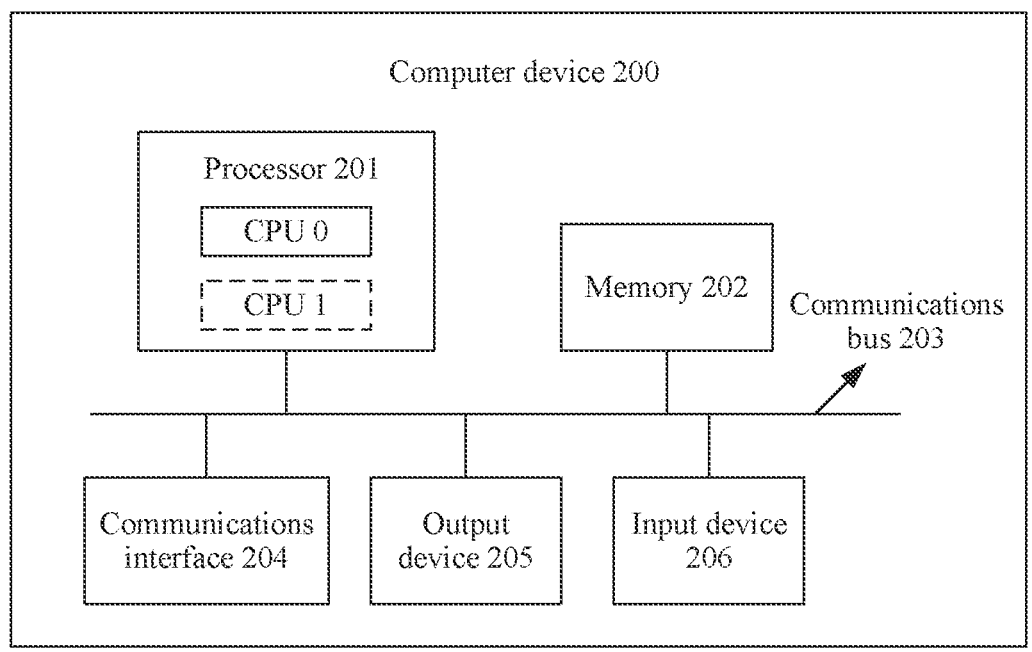
FIG. 4 shows a schematic diagram of a computer device according to an embodiment of the present disclosure.

It should be noted that the PS domain management network element 101 and the terminal device 102 shown in FIG. 3 may be implemented by using a computer device (or system) 200 shown in FIG. 4. Optionally, when the system 100 includes the mobility management network element in the CS domain 103, the mobility management network element in the CS domain 103 may also be implemented by using the computer device 200 shown in FIG. 4.

FIG. 4 is a schematic diagram of a computer device (or system) 200 according to an embodiment of the present disclosure. The computer device 200 includes at least one processor 201, a memory 202, a communications bus 203, and at least one communications interface 204.

The processor 201 may be a central processing unit (CPU), a microprocessor, an application-specific integrated circuit (ASIC), or one or more integrated circuits configured to control program execution of the solutions of the present disclosure.

The memory 202 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a disk storage medium or another disk storage device, or any other medium that can be used to carry or store expected program code in a form of an instruction or a data structure and that can be accessed by a computer. However, the memory 202 is not limited herein. The memory may exist independently and is connected to the processor by using the communications bus 203. Alternatively, the memory may be integrated with the processor.

The memory 202 is configured to store application program code for executing the solutions of the present disclosure, and the processor 201 is configured to execute the application program code stored in the memory 202.

In specific implementation, in an embodiment, the processor 201 may include one or more CPUs, for example, a CPU 0 and a CPU 1 shown in FIG. 4

In specific implementation, in an embodiment, the computer device 200 may include a plurality of processors, and each processor may be a single-core (single-CPU) processor, or may be a multi-core (multi-CPU) processor. The processor herein may be one or more devices, circuits, and/or processing cores configured to process data (for example, a computer program instruction).

In specific implementation, in an embodiment, the computer device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode-ray tube (CRT) display device, a projector, or the like. The input device 206 communicates with the processor 201, and may receive input of a user in a plurality of manners. For example, the input device may be a mouse, a keyboard, a touchscreen device, a sensing device, or the like.

The computer device 200 may be a general-purpose computer device or a dedicated computer device. In specific implementation, the computer device 200 may be a desktop computer, a portable computer, a network server, a personal digital assistant (PDA), a mobile phone, a tablet computer, a wireless terminal device, a communications device, an embedded device, or a device having a structure similar to that in FIG. 4. A type of the computer device 200 is not limited in this embodiment of the present disclosure.

For ease of understanding and description, the following describes the SMS processing method in the Internet of Things in the embodiments of the present disclosure by using the architecture shown in FIG. 1 as an example and by using an example in which a mobility management entity (MME) in an EPS network is used as a mobility management network element in a PS domain.

It should be understood that in the embodiments of the present disclosure, numbers "first" and "second" are merely intended to distinguish between different objects, for example, to distinguish different indication information, and shall not be construed as any limitation to the protection scope of the embodiments of the present disclosure.

It should be further understood that steps or operations shown in the following method embodiments are merely examples, and other operations or variations of various operations may be performed. In addition, in specific implementation, the steps may be performed in a sequence different from that in the embodiments of the present disclosure, and it is possible that not all operations or steps shown in the embodiments of the present disclosure are performed. Alternatively, more operations or steps than those shown in the embodiments of the present disclosure may be performed.

For ease of understanding and description, the following describes in detail the SMS processing method in the Internet of Things in the embodiments of the present disclosure by using an example in which an MME is used as a mobility management network element in a PS domain and an MSC/VLR is used as a mobility management network element in a CS domain.

In the embodiments of the present disclosure, after receiving a non-combined registration request (carrying SMS only indication information) sent by UE, the MME separately performs different processing procedures based on whether the MME supports an SMS transfer without combined procedure "SMS transfer without combined procedure" standard feature. The following separately describes a case (for ease of understanding and description, the case is denoted as Case 1 below) in which the MME supports the "SMS transfer without combined procedure" standard feature and a case (for ease of understanding and description, the case is denoted as Case 2 below) in which the MME does not support the "SMS transfer without combined procedure" standard feature.

Case 1:
The MME supports the "SMS transfer without combined procedure" standard feature.

Figure 5:
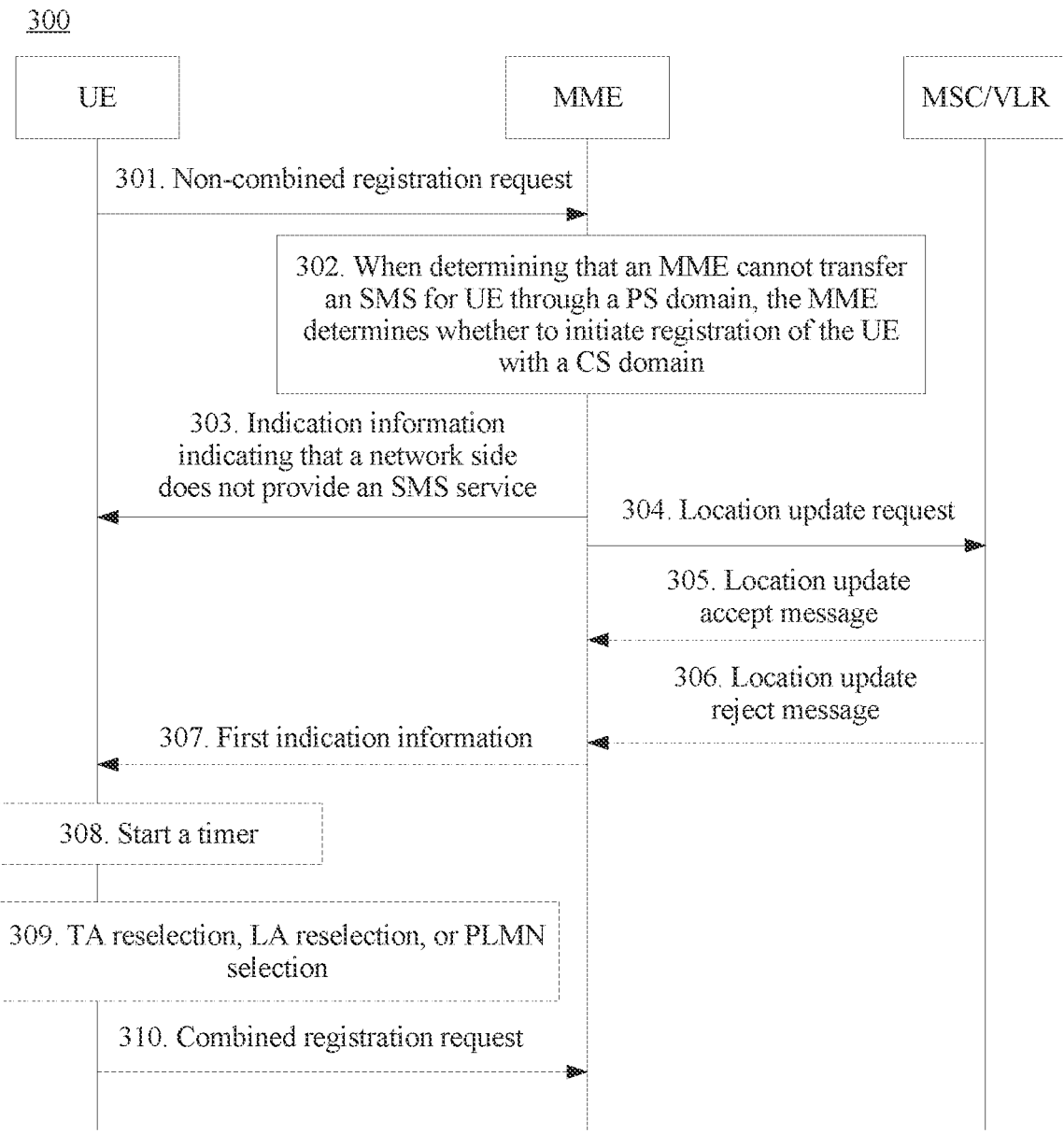
FIG. 5 is a flowchart of an SMS processing method in an Internet of Things according to an embodiment of the present disclosure.

FIG. 5 shows a flowchart of an SMS processing method 300 in an Internet of Things according to an embodiment of the present disclosure. As shown in FIG. 5, the method 30) mainly includes step 301 and step 302.

301. UE sends a non-combined registration request to an MME, and the MME receives the non-combined registration request sent by the UE.

The non-combined registration request is used to implement registration of a terminal device with a PS domain. The non-combined registration request carries SMS only indication information.

In the embodiments of the present disclosure, the SMS only indication information is used to indicate that the terminal device requests to obtain an SMS service. In other words, the SMS only indication information is used to indicate that the terminal device needs to transfer an SMS.

It may be understood that in this embodiment of the present disclosure, the terminal device sends the non-combined registration request to the MME, and the non-combined registration request carries the SMS only indication information, to indicate that the terminal device supports an "SMS transfer without combined procedure" standard feature. In other words, the terminal device sends the non-combined registration request (carrying the SMS only indication information) to the MME to request to implement registration with the PS domain, so as to obtain the SMS service from a network side.

302. When determining that the MME cannot transfer an SMS for the UE through a PS domain, the MME determines whether to initiate registration of the UE with a CS domain.

It may be understood that if the MME supports the "SMS transfer without combined procedure" standard feature, when receiving the non-combined registration request (carrying the SMS only indication information) sent by the UE, the MME first needs to determine whether the MME can transfer the SMS through the PS domain. In other words, the MME determines whether the MME can provide the SMS service via SMS in MME.

When determining that the MME cannot provide the SMS service for the UE through the PS domain, the MME further determines whether to initiate the registration of the UE with the CS domain.

Specifically, for a process of determining, by the MME, whether the MME can transfer the SMS for the UE through the PS domain, refer to the prior art. To avoid repetition, details are not described herein.

It may be understood that there may be two cases (for ease of differentiation, the two cases are separately denoted as Case 1.1 and Case 1.2 below) after the MME determines whether to initiate the registration of the UE with the CS domain.

Case 1.1:
The MME determines not to initiate the registration of the UE with the CS domain.

In this case, the MME performs step 303.

303. The MME sends, to the UE, indication information indicating that a network side does not provide an SMS service, and the UE receives the indication information that is sent by the MME and that indicates that the network side does not provide the SMS service.

Case 1.2:
The MME determines to initiate the registration of the UE with the CS domain.

In this case, the MME performs step 304 and subsequent steps.

304. The MME sends a location update request to an MSC/VLR, and the MSC/VLR receives the location update request sent by the MME.

The location update request is used to implement the registration of the terminal device with the CS domain.

Optionally, in an embodiment, the method further includes:

305. The MSC/VLR sends a location update accept message to the MME, and the MME receives the location update accept message sent by the MSC/VLR, where the location update accept message is used to indicate that a network side accepts the registration of the terminal device with the CS domain.

In this embodiment, the MSC/VLR receives the location update request sent by the MME. If the MSC/VLR accepts the registration of the UE with the CS domain, the MSC/VLR sends the update location accept message to the MME.

Optionally, in an embodiment, the location update accept message includes a CS domain mobility management parameter, and the method further includes:

The MME stores the CS domain mobility management parameter, so that when the MME needs to implement the registration of the terminal device with the CS domain again, the CS domain mobility management parameter is used to implement the registration of the terminal device with the CS domain.

In this embodiment, the MME requests the registration of the UE with the CS domain, to provide the SMS service for the terminal device. A mobility management network element in a CS domain (for example, the MSC/VLR) determines whether the registration of the terminal device with the CS domain can be accepted. Specifically, for a manner of determining, by the MSC/VLR, whether the registration of the terminal device with the CS domain can be accepted, refer to the prior art. Details are not described herein.

When the MSC/VLR determines that the registration of the terminal device with the CS domain can be accepted, the MSC/VLR sends the location update accept message to the MME. In this way, the MME may learn that the terminal device successfully registers with the CS domain, and provides the SMS service for the terminal device through the CS domain. Even if the SMS cannot be transferred through the PS domain, when the registration of the terminal device with the CS domain succeeds, the terminal device pays no attention to which path the network side provides the SMS service, in other words, the terminal does not know which path the network side provides the SMS service. Therefore, user experience of the SMS service can be improved.

Optionally, the MSC/VLR may further add the CS domain mobility management parameter to the location update accept message, so that the MME uses the CS domain mobility management parameter when subsequently re-initiating the registration of the terminal device with the CS domain. However, the MME does not send the CS domain mobility management parameter to the terminal device. In this case, the terminal device does not know that the MME requests the registration of the terminal device with the CS domain for the terminal device.

Optionally, in an embodiment, the method further includes:

306. The MSC/VLR sends a location update reject message to the MME, and the MME receives the location update reject message sent by the MSC/VLR, where the location update reject message is used to indicate that the MSC/VLR rejects the registration of the terminal device with the CS domain.

307. The MME sends first indication information to the UE, where the first indication information is used to indicate that a network side cannot provide an SMS service for the terminal device, and the UE receives the first indication information sent by the MME.

Different from the foregoing embodiment, in this embodiment, when the MSC/VLR determines that the registration of the terminal device with the CS domain cannot be accepted, the MSC/VLR sends the location update reject message to the MME. The MME may learn that the registration of the terminal device with the CS domain fails. In this case, neither the PS domain nor the CS domain can provide the SMS service for the terminal device. Therefore, the MME may indicate, to the UE, that the network side cannot provide the SMS service, so that the UE re-initiates a request for obtaining the SMS service or tries to obtain the SMS service at another location or in another network.

Optionally, in an embodiment, the method further includes:

308. The UE starts a timer, and resends a non-combined registration request to the MME when the timer expires, where the non-combined registration request carries the SMS only indication information.

309. The UE performs any one of the following actions to re-request to obtain the SMS service: tracking area (TrTA) reselection, location area (LA) reselection, or public land mobile network (PLMN) selection.

310. The UE initiates a combined registration request to the MME, and the MME receives the combined registration request sent by the UE, where the combined registration request carries the SMS only indication information.

In this embodiment of the present disclosure, after learning that the network side cannot provide the SMS service, the UE may start the timer. After the timer expires, the UE continues to send the non-combined registration request (carrying the SMS only indication information) to the MME, to re-request to obtain the SMS service. Alternatively, the UE may perform TA reselection, LA reselection, or PLMN selection, to try to obtain the SMS service at another location or in another network. Alternatively, the UE initiates the combined registration request (carrying the SMS only indication information) to the network side. In other words, the UE obtains the SMS service by using the prior art.

TA reselection is implemented by the UE by selecting a suitable cell in a new TA, and LA reselection is implemented by the UE by selecting a suitable cell (suitable cell) in a new LA. Specifically, for a process of TA reselection, LA reselection, and PLMN selection, refer to the prior art. Details are not described herein.

In this embodiment, the MME performs a conversion from a non-combined registration procedure (also referred to as Normal Attach/TAU) to a combined registration procedure (also referred to as Combined Attach/TAU), to establish an SGs interface association for the UE that initiates the non-combined registration request, thereby implementing successful registration of the UE with the CS domain. Therefore, when SMS in MME is not deployed on the network side, the SMS service can be provided for an Internet of Things terminal device.

It should be understood that the actions performed by the MME or the UE in the method 300 may be implemented by a processor by executing an instruction stored in a memory.

Case 2:

The MME does not support the "SMS transfer without combined procedure" standard feature.

Figure 6:
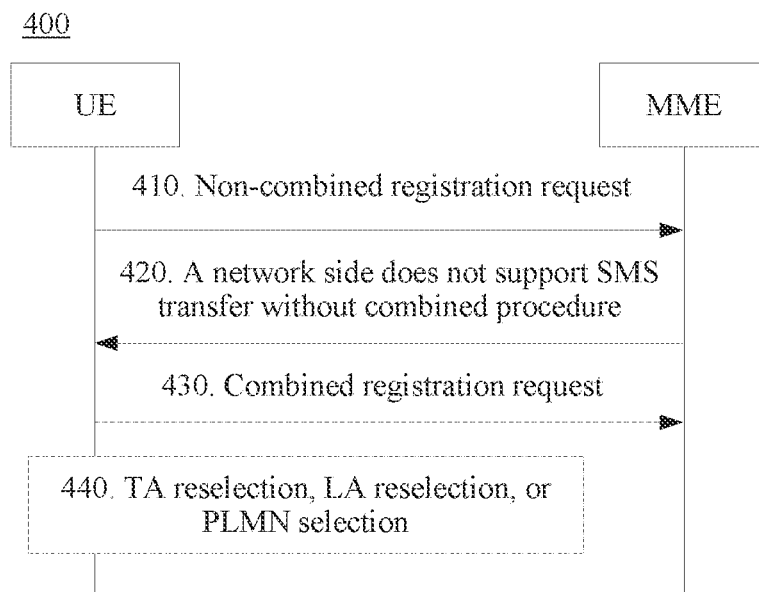
FIG. 6 is a flowchart of an SMS processing method in an Internet of Things according to another embodiment of the present disclosure.

FIG. 6 shows a flowchart of an SMS processing method 400 in an Internet of Things according to another embodiment of the present disclosure. As shown in FIG. 6, in this embodiment, the method 400 mainly includes step 410 and step 420.

410. UE sends a non-combined registration request to an MME, and the MME receives the non-combined registration request sent by the UE, where the non-combined registration request carries SMS only indication information.

Specifically, for step 410, refer to the description in the foregoing step 301. Details are not described herein.

420. When the MME determines that the MME does not support SMS transfer without combined procedure (SMS transfer without combined procedure), the MME sends first indication information to the terminal device, where the first indication information is used to indicate that the mobility management network element in the PS domain does not support SMS transfer without combined procedure.

Correspondingly, the UE can learn, based on the received first indication information, that the MME cannot provide an SMS service because the MME does not support SMS transfer without combined procedure.

Optionally, in an embodiment, the method further includes:

430. The UE sends a combined registration request to the MME, where the combined registration request carries indication information indicating that an SMS needs to be transferred. The MME receives the combined registration request sent by the UE.

440. The UE performs any one of the following actions to re-request to obtain an SMS service: tracking area TA reselection, location area LA reselection, or public land mobile network PLMN selection.

It may be understood that in this embodiment, the UE learns that the MME does not support an "SMS transfer without combined procedure" standard feature. If the UE needs to re-request to obtain the SMS service at a current location or in a current network, the UE should send the combined registration request (carrying the SMS only indication information) to the MME. Alternatively, the UE may perform tracking area reselection, location area reselection, or PLMN selection, to try to obtain the SMS service at another location or in another network.

For a specific implementation process of step 430 and step 440, refer to the prior art. Details are not described herein.

In this embodiment of the present disclosure, when the MME does not support the SMS transfer without combined procedure "SMS transfer without combined procedure" standard feature, if the MME receives the non-combined registration request (carrying the SMS only indication information) sent by the terminal device, the MME may notify, by sending the indication information to the UE, the UE that a network side cannot provide the SMS service. Specifically, the MME may notify the UE of a reason that the network side cannot provide the SMS service. In this way, when the UE needs to continue to perform the SMS service, the UE may re-request, in a corresponding manner, to obtain the SMS service.

It may be learned that in this embodiment, when the MME does not support the "SMS transfer without combined procedure" standard feature, if the MME receives the non-combined registration request that is sent by the UE and that is used to request to obtain the SMS service, the MME notifies, in an explicit manner, the UE of the reason that the network side cannot provide the SMS service. When learning the reason, the UE may try to obtain again the SMS service by optimizing a behavior of the UE. Compared with the prior art in which the UE cannot learn the reason that the network side cannot provide the SMS service, the technical solution provided in this embodiment may improve service experience of a user for the SMS service.

It should be understood that the actions performed by the MME or the UE in the method 400 may be implemented by a processor by executing an instruction stored in a memory.

The following describes the SMS processing method in the embodiments of the present disclosure with reference to a plurality of embodiments.

Figure 7:
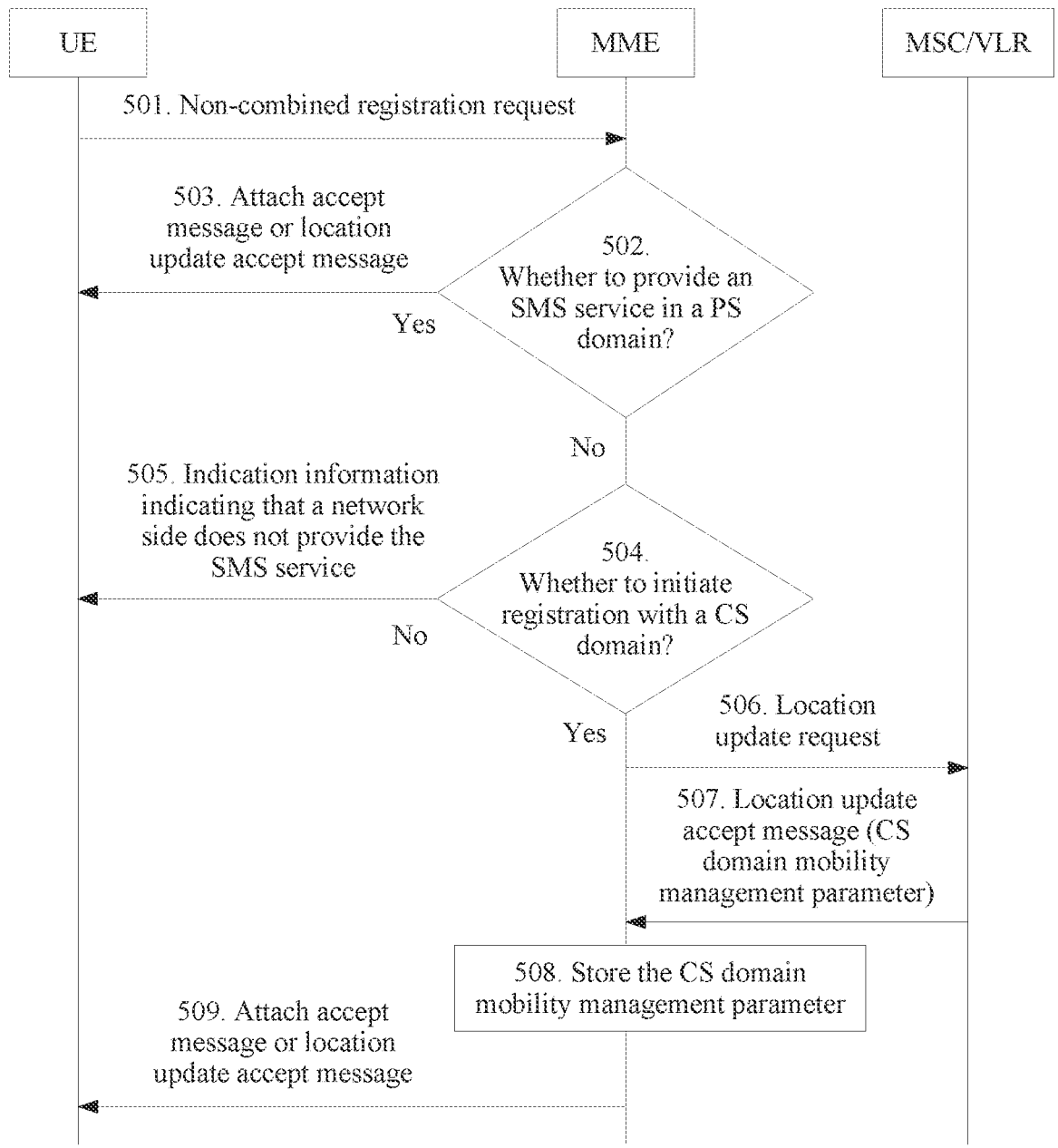
FIG. 7 is a flowchart of an SMS processing method in an Internet of Things according to an embodiment of the present disclosure.

FIG. 7 shows a schematic flowchart of an SMS processing method in an Internet of Things according to an embodiment of the present disclosure. As shown in FIG. 7, a specific process includes the following steps.

501. UE sends a non-combined registration request to an MME, to request registration with a PS domain on a network side. The MME receives the non-combined registration request sent by the UE.

Specifically, the non-combined registration request may be in a plurality of forms. For example, the non-combined registration request may be a non-combined attach request or a non-combined location update request.

If the non-combined registration request is the non-combined attach request (an example of the non-combined registration request), the attach request carries attach type information (also referred to as an attach type information element). The attach type information is evolved packet system attach (EPS Attach). "EPS attach" indicates that the UE initiates only a registration request (the non-combined registration request) to the PS domain.

If the non-combined registration request is the non-combined location update request (an example of the non-combined registration request), the location update request carries update type information (also referred to as an update type information element). The update type information is tracking area updating and indicates that the UE initiates only a location update request (the non-combined location update request) to the PS domain.

In addition, the non-combined attach request or the non-combined location update request carries SMS only indication information, and the SMS only indication information is used to indicate that the UE requests to obtain an SMS service. In other words, the UE needs to transfer an SMS. For example, the non-combined attach request or the non-combined location update request carries an "SMS only" indication, to indicate that the UE needs to perform the SMS service.

502. The MME determines whether the MME can provide an SMS service in the PS domain for the UE.

Specifically, for a manner of determining, by the MME, whether the MME can provide the SMS service in the PS domain for the UE or whether the MME can provide the SMS service via SMS in MME for the UE, refer to the prior art. Details are not described herein. For example, the MME may perform determining based on factors such as whether the MME supports an SGd interface, whether the MME supports SMS in MME, or whether a home subscriber server (HSS) subscribes to SMS in MME.

If the MME determines that the MME can provide the SMS service in the PS domain for the UE, in other words, the MME can provide the SMS service via SMS in MME for the UE, step 503 is performed. If the MME determines that the MME cannot provide the SMS service in the PS domain for the UE, in other words, the MME cannot provide the SMS service via SMS in MME for the UE, step 504 and subsequent steps are performed.

503. The MME sends an attach accept message or a location update accept message to the UE, and the UE receives the attach accept message or the location update accept message sent by the MME.

Corresponding to step 501, if the attach accept message is sent, the attach accept message carries attach result information (also referred to as an attach result information element). The attach result information is "EPS only", to indicate that the UE successfully registers with only the PS domain. If the location update accept message is sent, the location update accept message carries update result information (also referred to as an update result information element). The update result information is "tracking area updating", to indicate that the UE successfully completes a location update to the PS domain.

In addition, the attach accept message or the location update accept message carries "SMS only" information, to indicate that the network side can provide the SMS service for the UE.

It should be understood that if the MME can provide an SMS in MME service for the UE, an entire procedure ends after step 503 is performed.

504. The MME determines whether to initiate registration of the UE with a CS domain.

Specifically, there are two cases (for ease of differentiation, the two cases are separately denoted as Case #A and Case #B below) after the MME determines whether to initiate the registration of the UE with the CS domain.

Case #A:

The MME determines not to initiate the registration of the UE with the CS domain.

In Case #A, the MME performs step 505.

505. The MME sends, to the UE, indication information indicating that the network side does not provide the SMS service, and the UE receives the indication information that is sent by the MME and that indicates that the network side does not provide the SMS service.

It may be learned from the foregoing description that when receiving the indication information that is sent by the MME and that indicates that the SMS service cannot be provided, the UE may perform any one of the following actions or procedures to request to obtain again the SMS service from the network side: The UE sends, to the MME, a non-combined registration request that carries the SMS only indication information; the UE sends, to the MME, a combined registration request that carries the SMS only indication information: or the UE performs TA reselection. LA reselection, or PLMN selection. Details are not described herein.

Case #B:

The MME determines to initiate the registration of the UE with the CS domain.

In Case #B, the MME performs step 506 and subsequent steps.

506. The MME sends a location update request to a CS domain network element: a mobile service switching center MSC/visitor location register VLR, to request the registration of the UE with the CS domain, and the MSC/VLR receives the location update request sent by the MME.

Specifically, the MME adds update type information (also referred to as an update type information element) to the location update request. The update type information is normal location update.

It may be understood that when the MME cannot provide an SMS in MME service for the UE, the MME sends the location update request to the MSC/VLR in the CS domain. This actually implements a conversion from a non-combined registration procedure to a combined registration procedure.

507. If the MSC/VLR accepts the location update request to the CS domain for the UE, the MSC/VLR sends a location update accept message to the MME, and the MME receives the location update accept message sent by the MSC/VLR.

Optionally, the location update accept message carries a CS domain mobility management parameter allocated by the MSC/VLR to the UE.

It should be noted that the MSC/VLR does not know that the MME sends the CS domain location update request after the MME receives the non-combined registration request sent by the UE. In other words, the MSC/VLR does not know that the MME performs the conversion from the non-combined registration procedure to the combined registration procedure. The MSC/VLR performs a CS domain location update procedure for the UE with reference to the prior art, and allocates the CS domain mobility management parameter to the UE. The CS domain mobility management parameter is used to establish an SGs interface association for the UE, to implement the registration of the UE with the CS domain.

Specifically, the CS domain mobility management parameter includes a location area identity (LAI), a temporary mobile subscriber identity (TMSI), an international mobile subscriber identity (IMSI), or the like. For descriptions of the LAI, the TMSI, and the IMSI, refer to the prior art. Details are not described herein.

508. The MME stores a CS domain mobility management parameter, so that when the MME needs to implement the registration of the UE with the CS domain again, the CS domain mobility management parameter is used to implement the registration of the UE with the CS domain.

It should be understood that the CS domain management parameter stored by the MME may be used subsequently when an SGs location update procedure (implementing the registration of the UE with the CS domain) to the MSC/VLR is initiated for the UE.

It should be noted that the MME receives and stores the CS domain mobility management parameter sent by the MSC/VLR, but does not send the CS domain mobility management parameter to the UE. From a perspective of the UE, the UE initiates only the registration with the PS domain on the network side in step 501. To be specific, the UE does not know the location update request sent by the MME to the CS domain after the MME receives the non-combined registration request sent by the UE. In other words, the UE does not know that the MME performs the conversion from the non-combined registration procedure to the combined registration procedure.

509. The MME sends an attach accept message or a location update accept message to the UE, and the UE receives the attach accept message or the location update accept message sent by the MME.

It should be noted that for the attach accept message and the location update accept message in step 509, refer to the description in step 503. For brevity, details are not described herein.

It can be learned from the foregoing procedure that when the MME can provide the SMS in MME service for the UE, step 503 is directly performed, to indicate, to the UE, that the network side can provide the SMS service. However, when the MME cannot provide the SMS in MME service for the UE and the MME determines to initiate the registration of the UE with the CS domain, step 506 to step 508 are performed, so that the MME completes conversion processing from non-combined registration to combined registration of the UE. In step 509, the MME indicates, to the UE, that the network side can provide the SMS service. It can be seen that the UE does not know this process.

In this embodiment, the MME performs the conversion from the non-combined registration procedure (also referred to as Normal Attach/TAU) to the combined registration procedure (also referred to as Combined Attach/TAU), to establish the SGs interface association for the UE that initiates the non-combined registration request, thereby implementing successful registration of the UE with the CS domain. Therefore, when the network side does not support the SMS in MME service, the SMS service can be provided for the UE. This ensures an SMS service requirement of the UE, and prevents an operator from forcibly deploying an SMS in MME feature on the network side to support the SMS service, so that the SMS service can be provided for an Internet of Things terminal device, and user experience is improved.

It may be understood that the MME sends the location update request to the MSC/VLR, to request the registration of the UE with the CS domain. If the MSC/VLR accepts the location update request to the CS domain for the UE, step 507 is performed. If the MSC/VLR rejects the location update request to the CS domain for the UE, a procedure of the SMS processing method in the Internet of Things in the embodiments of the present disclosure is described with reference to FIG. 8.

It should be understood that the actions performed by the MME or the UE in this embodiment may be implemented by a processor by executing an instruction stored in a memory.

Figure 8:
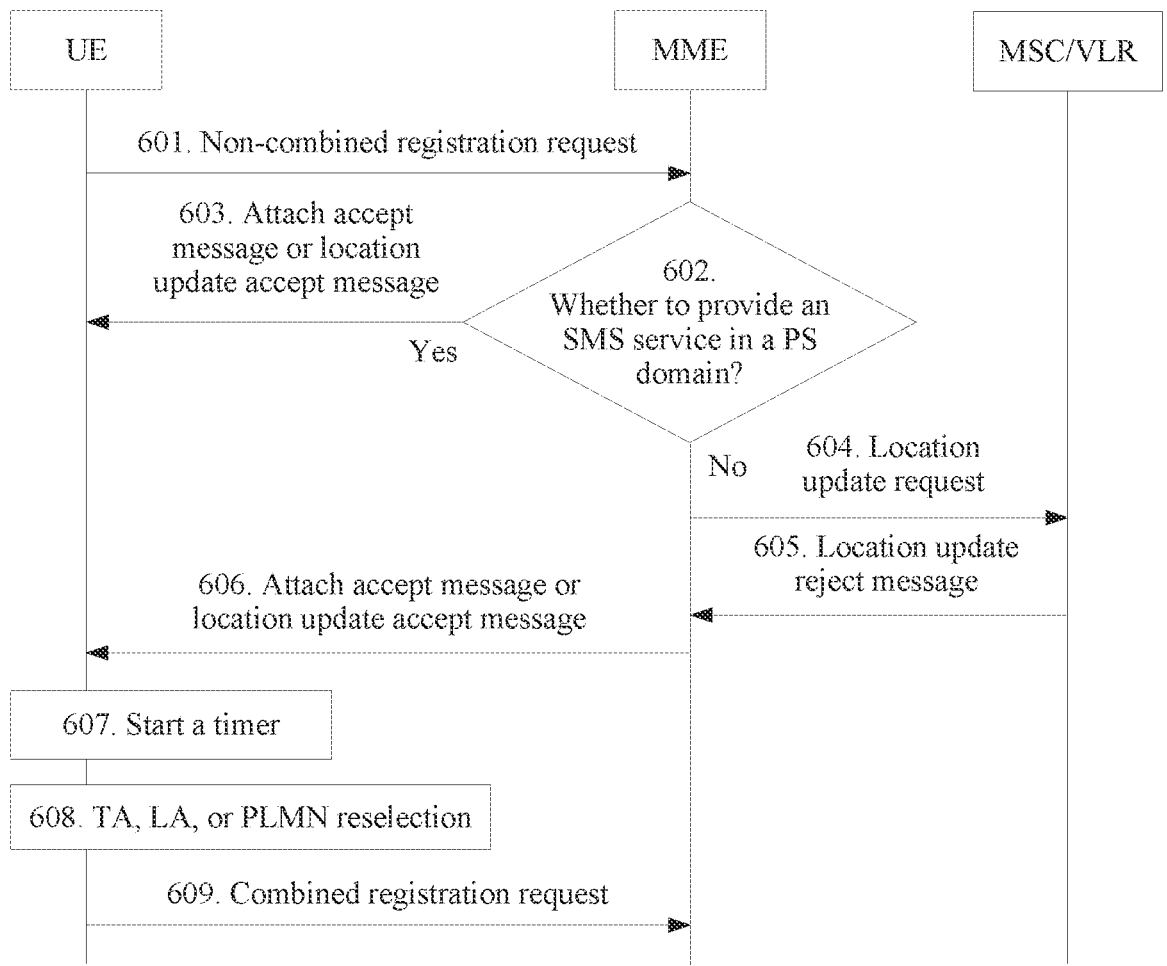
FIG. 8 is a flowchart of an SMS processing method in an Internet of Things according to another embodiment of the present disclosure.

FIG. 8 shows a schematic flowchart of an SMS processing method in an Internet of Things according to another embodiment of the present disclosure.

601-604. UE sends a non-combined registration request to an MME, and the MME receives the non-combined registration request sent by the UE. When the MME determines that the MME cannot provide an SMS in MME service for the UE, the MME sends a location update request to an MSC/VLR in a CS domain, to request registration of the UE with the CS domain. The MSC/VLR receives the location update request sent by the MME.

It should be noted that in this embodiment, after step 602 and before step 604, the MME needs to determine whether to initiate a registration procedure of the UE with the CS domain. For a specific process, refer to the foregoing step 504. To avoid repetition, description of this step is omitted herein. When determining to initiate the registration of the UE with the CS domain, the MME performs step 604 and subsequent steps.

It should be understood that in this embodiment, when the MME determines not to initiate the registration of the UE with the CS domain, refer to the description in the foregoing step 505. To avoid repetition, description of this step is also omitted herein.

Specifically, for step 601 to step 604, refer to the descriptions in step 501 to step 506. For brevity, details are not described herein.

605. If the MSC/VLR rejects the location update request to the CS domain for the UE, the MSC/VLR sends a location update reject message to the MME, and the MME receives the location update reject message sent by the MSC/VLR Specifically, the MSC/VLR adds reject cause information to the location update reject message. In this embodiment of the present disclosure, the MSC/VLR may determine, based on factors such as CS domain congestion control and MSC/VLR restart caused by a fault, whether to accept the registration of the UE with the CS domain. For a specific determining process, refer to the prior art. Details are not described herein.

Optionally, the location update reject message carries a CS domain mobility management parameter.

606. After the MME receives the location update reject message sent by the MSC/VLR, if the UE successfully registers with a PS domain, the MME sends an attach accept message or a location update accept message to the UE, and the UE receives the attach accept message or the location update accept message sent by the MME.

Similar to the foregoing description (refer to the foregoing step 503), the attach accept message carries attach result information (for example, the attach result information may be "EPS only"), to indicate that the UE successfully registers with the PS domain. The location update accept message carries update result information. Similarly, the update result information is used to indicate that the UE successfully registers with the PS domain.

It should be noted that when the UE fails to register with the CS domain, the attach accept message or the location update accept message further carries indication information indicating that a network side cannot provide an SMS service (for ease of differentiation, the indication information is denoted as indication information #1 below).

The MME may send the indication information #1 to the UE in a plurality of manners, for example, the MME may add a cause value to the attach accept message or the location update accept message. Alternatively, the MME may add an indication bit to an existing information element (for example, an attach result information element or an update result information element (refer to the foregoing step 503)) included in the attach accept message or the location update accept message. Alternatively, the MME may change a value of an existing indication bit in an existing information element (for example, an attach result information element or an update result information element (refer to the foregoing step 503)) included in the attach accept message or the location update accept message (for example, the MME changes a value "SMS only" of a bit to "00"). Alternatively, after performing step 606, to be specific, after sending the attach accept message or the location update accept message, the MME may separately send the indication information #1 to the UE by using a dedicated message. Alternatively, the MME may send the indication information #1 to the UE in another available manner in the art. This is not limited in this embodiment of the present disclosure.

It may be understood that because the MME cannot provide the SMS service in the PS domain, and the UE fails to register with the CS domain, the network side cannot provide the SMS service for the UE.

Correspondingly, the UE receives the attach accept message or the location update accept message sent by the MME.

It should be understood that after receiving the attach accept message or the location update accept message sent by the MME, the UE can learn, based on the indication information #1, that the network side cannot provide the SMS service.

Optionally, the UE performs any one of step 607, step 608, or step 609.

607. The UE starts a timer, and resends a non-combined registration request to the MME when the timer expires, to continue to try to obtain the SMS service at a current location. In other words, execution starts from step 601.

608. The UE initiates TA reselection, LA reselection, or PLMN selection, to obtain the SMS service at another location or in another network.

609. The UE initiates a combined registration request to the MME, and the MME receives the combined registration request sent by the UE, where the combined registration request carries SMS only indication information.

In step 609, the UE obtains the SMS service by using the prior art.

It may be understood that, to ensure that an EPS service is not affected, after learning that the network side cannot provide the SMS service, the UE may accept that the SMS service is not continued. Certainly, the UE may not perform any action.

In this embodiment, the MME performs a conversion from a non-combined registration procedure (also referred to as Normal Attach/TAU) to a combined registration procedure (also referred to as Combined Attach/TAU), to perform the registration with the CS domain for the UE that initiates the non-combined registration request. When the registration with the CS domain fails, the MME sends the indication information to the UE, to notify the UE that the network side cannot provide the SMS service for the UE, so that the UE can try to obtain again the SMS service by performing different actions. This can prevent an operator from forcibly deploying an SMS in MME feature on the network side to support the SMS service of the UE, thereby improving user experience.

It should be understood that the actions performed by the MME or the UE in this embodiment may be implemented by a processor by executing an instruction stored in a memory.

Figure 9:
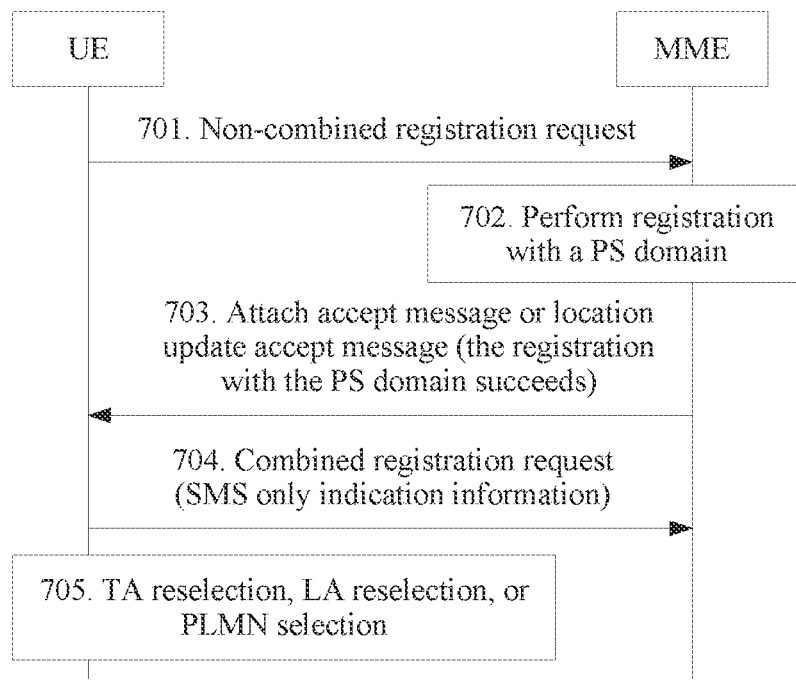
FIG. 9 is a flowchart of an SMS processing method in an Internet of Things according to still another embodiment of the present disclosure.

FIG. 9 shows a schematic flowchart of an SMS processing method in an Internet of Things according to still another embodiment of the present disclosure. As shown in FIG. 9, the method mainly includes the following steps.

701. UE initiates a non-combined registration request to an MME, and the MME receives the non-combined registration request sent by the UE.

For a specific process, refer to the description in step 501. For brevity, details are not described herein.

702. The MME performs registration of the UE with a PS domain.

It should be noted that in this embodiment, the MME does not support an "SMS transfer without combined procedure" standard feature. To be specific, after receiving the non-combined registration request that is sent by the UE and that carries SMS only indication information, the MME performs only the registration of the UE with the PS domain, and does not perform registration with a CS domain.

703. If the MME successfully performs the registration of the UE with the PS domain, the MME sends an attach accept message or a location update accept message to the UE, and the UE receives the attach accept message or the location update accept message sent by the MME.

For the attach accept message or the location update accept message, refer to the foregoing descriptions. Details are not described herein.

It should be noted that in this embodiment, if the MME does not support the "SMS transfer without combined procedure" standard feature, the MME adds, to the attach accept message or the location update accept message sent to the UE, indication information (for ease of differentiation, the indication information is denoted as indication information #2 below) indicating that a network side does not support the "SMS transfer without combined procedure" standard feature.

The MME may send the indication information #2 to the UE in a plurality of manners. For example, the MME may add a cause value to the attach accept message or the location update accept message. Alternatively, the MME may add an indication bit to an existing information element (for example, an EPS network feature support information element) included in the attach accept message or the location update accept message. Alternatively, the MME may change a value of an existing indication bit in an existing information element (for example, an EPS network feature support information element) included in the attach accept message or the location update accept message. Alternatively, after performing step 703, to be specific, after sending the attach accept message or the location update accept message, the MME may separately send the indication information #2 to the UE by using a dedicated message. Alternatively, the MME may send the indication information #2 to the UE in another available manner in the art. This is not limited in this embodiment of the present disclosure.

It may be understood that after receiving the attach accept message or the location update accept message, the UE can learn, based on the indication information #2 carried in the attach accept message or the location update accept message, that the network side does not support the "SMS transfer without combined procedure" standard feature.

In this case, optionally, the UE may perform step 704 or step 705.

704. The UE initiates a combined registration request to the MME, and the MME receives the combined registration request sent by the UE, where the combined registration request carries the SMS only indication information.

It may be understood that the UE learns that the network side does not support the "SMS transfer without combined procedure" standard feature. Therefore, if the UE needs to continue to request to obtain an SMS service from the network side, the UE should initiate the combined registration request to the network side. In other words, the UE obtains the SMS service by using the prior art.

It may be learned that in the foregoing embodiments, when learning that the network side cannot provide the SMS service, if the UE needs to continue to request to obtain the SMS service, the UE may resend a non-combined registration request to the MME, to try to obtain the SMS service again. A reason is that although the network side cannot provide the SMS service for the UE, the network side supports the "SMS transfer without combined procedure" standard feature. Therefore, the network side currently cannot provide the UE with the SMS service possibly because the UE fails to register with the CS domain due to current CS domain congestion or an MSC/VLR fault. Therefore, the UE may resend the non-combined registration request to the MME. Registration that is of the UE with the CS domain and that is performed by the MME again may succeed. In this way, the network side may complete a conversion from a non-combined registration procedure to a combined registration procedure, to provide the SMS service for the UE.

However, different from the foregoing embodiments, the UE learns that the network side does not support the "SMS transfer without combined procedure" standard feature instead of that the network side cannot provide the SMS service in this embodiment. Therefore, if the UE needs to continue to obtain the SMS service at a current location or in a current network, the UE needs to initiate the combined registration request. In this way, after receiving the combined registration request of the UE, the MME performs the combined registration procedure, to be specific, the MME sends a location update request to an MSC/VLR in the CS domain, to implement the registration of the UE with the CS domain. When the registration with the CS domain succeeds, the network side can provide the SMS service for the UE, to meet an SMS service requirement of an Internet of Things terminal.

705. The UE initiates a TA reselection, LA reselection, or PLMN selection procedure, to obtain an SMS service at another location or in another network.

It should be understood that when learning that a current network side does not support the "SMS transfer without combined procedure" standard feature, the UE may try to request to obtain the SMS service at another location or in another network.

In this embodiment, when the network side does not support the "SMS transfer without combined procedure" standard feature, if the MME receives the non-combined registration request that is sent by the UE and that is used to request to obtain the SMS service, the MME notifies, in an explicit manner, the UE of a reason that the network side cannot provide the SMS service. When learning the reason, the UE may try to obtain again the SMS service by optimizing a behavior of the UE. Compared with the prior art in which the UE cannot learn the reason that the network side cannot provide the SMS service, the technical solution provided in this embodiment may improve service experience of a user.

It should be understood that the actions performed by the MME or the UE in this embodiment may be implemented by a processor by executing an instruction stored in a memory.

The SMS processing method in the Internet of Things in the embodiments of the present disclosure is described in detail above with reference to FIG. 1 to FIG. 9. A mobility management network element and a terminal device in the embodiments of the present disclosure are described below with reference to FIG. 10 to FIG. 13.

Figure 10:
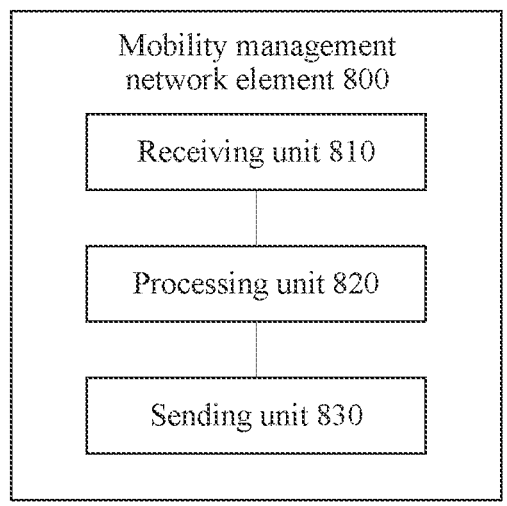
FIG. 10 shows a schematic block diagram of a mobility management network element according to an embodiment of the present disclosure.

FIG. 10 shows a schematic block diagram of a mobility management network element 800 according to an embodiment of the present disclosure. As shown in FIG. 10, the mobility management network element 800 includes:

a receiving unit 810, configured to receive a non-combined registration request sent by a terminal device, where the non-combined registration request is used to implement registration of the terminal device with a PS domain, and the non-combined registration request carries SMS only indication information:

a processing unit 820, configured to determine whether the mobility management network element can transfer an SMS for the terminal device through the PS domain; and a sending unit 830, configured to: when the processing unit 820 determines that the mobility management network element cannot transfer the SMS for the terminal device through the PS domain, send a location update request to a mobility management network element in a circuit switched CS domain, where the location update request is used to implement registration of the terminal device with the CS domain.

The SMS only indication information herein is used to indicate that the terminal device requests to obtain an SMS service. In other words, the SMS only indication information is used to indicate that the terminal device needs to transfer an SMS.

The mobility management network element 800 provided in this embodiment of the present disclosure may be corresponding to the mobility management entity (MME) described in the method 300. In addition, the modules or units in the mobility management network element 800 are respectively configured to perform the corresponding procedures performed by the MME in the method 300. For brevity, details are not described herein.

It should be understood that in this embodiment, the mobility management network element 800 is presented in a form of a functional unit. The "unit" herein may be an application-specific integrated circuit (ASIC), a circuit, a processor and a memory that execute one or more software or firmware programs, an integrated logic circuit, and/or another component that can provide the foregoing functions. In a simple embodiment, a person skilled in the art may figure out that the mobility management network element 800 may be in a form shown in FIG. 4. The receiving unit 810, the processing unit 820, and the sending unit 830 may be implemented by using the processor and the memory in FIG. 4. Specifically, the processor executes a computer program stored in the memory to implement the mobility management network element 800.

Figure 11:
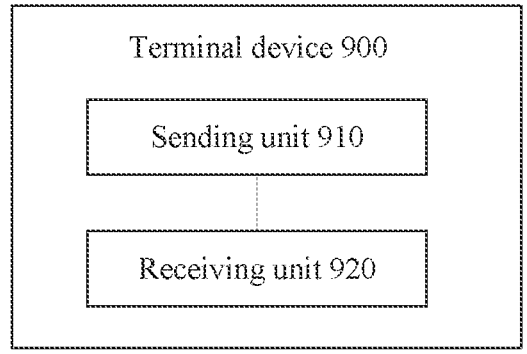
FIG. 11 shows a schematic block diagram of a terminal device according to an embodiment of the present disclosure.

FIG. 11 shows a schematic block diagram of a terminal device 900 according to an embodiment of the present disclosure. As shown in FIG. 11, the terminal device 900 includes:

a sending unit 910, configured to send a non-combined registration request to a mobility management network element in a packet switched PS domain, where the non-combined registration request is used to implement registration of the terminal device with a PS domain, and the non-combined registration request carries SMS only indication information; and a receiving unit 920, configured to receive first indication information sent by the mobility management network element in the PS domain, where the first indication information is used to indicate that the mobility management network element in the PS domain cannot provide an SMS service for the terminal device, and the first indication information is sent to the terminal device when the mobility management network element in the PS domain determines, after receiving the non-combined registration request sent by the terminal device, that the mobility management network element in the PS domain cannot transfer an SMS for the terminal device through the PS domain.

The SMS only indication information herein is used to indicate that the terminal device requests to obtain the SMS service. In other words, the SMS only indication information is used to indicate that the terminal device needs to transfer an SMS.

The terminal device 900 provided in this embodiment of the present disclosure may be corresponding to the terminal device described in the method 300. In addition, the modules or units in the terminal device 900 are respectively configured to perform the actions or the processing processes performed by the terminal device in the method 300. For brevity, details are not described herein.

It should be understood that in this embodiment, the terminal device 900 is presented in a form of a functional unit. The "unit" herein may be an application-specific integrated circuit (ASIC), a circuit, a processor and a memory that execute one or more software or firmware programs, an integrated logic circuit, and/or another component that can provide the foregoing functions. In a simple embodiment, a person skilled in the art may figure out that the terminal device 900 may be in a form shown in FIG. 4. The sending unit 910 and the receiving unit 920 may be implemented by using the processor and the memory in FIG. 4. Specifically, the processor executes a computer program stored in the memory to implement the terminal device 900.

Figure 12:
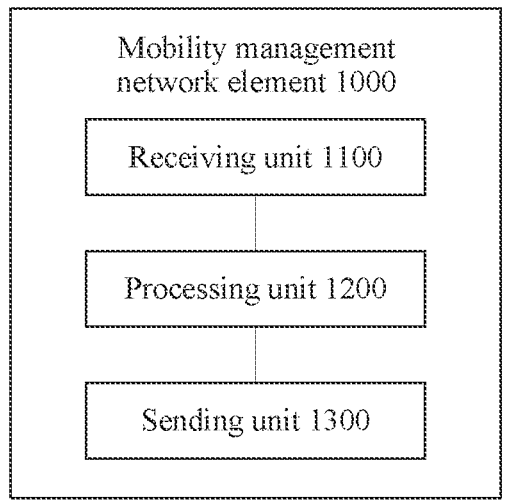
FIG. 12 shows a schematic block diagram of a mobility management network element according to another embodiment of the present disclosure.

FIG. 12 shows a schematic block diagram of a mobility management network element 1000 according to another embodiment of the present disclosure. As shown in FIG. 12, the mobility management network element 1000 includes:

a receiving unit 1100, configured to receive a non-combined registration request sent by a terminal device, where the non-combined registration request is used to implement registration of the terminal device with a packet switched PS domain, and the non-combined registration request carries SMS only indication information;

a processing unit 1200, configured to determine whether the mobility management network element can provide an SMS service for the terminal device; and a sending unit 1300, configured to: when the processing unit 1200 determines that the mobility management network element cannot provide the SMS service for the terminal device, send first indication information to the terminal device, where the first indication information is used to indicate that the mobility management network element cannot provide the SMS service for the terminal device.

The SMS only indication information herein is used to indicate that the terminal device requests to obtain the SMS service. In other words, the SMS only indication information is used to indicate that the terminal device needs to transfer an SMS.

The mobility management network element 1000 provided in this embodiment of the present disclosure may be corresponding to the mobility management entity (MME) described in the method 400. In addition, the modules or units in the mobility management network element 1000 are respectively configured to perform the actions or the processing processes performed by the MME in the method 400. For brevity, details are not described herein.

It should be understood that in this embodiment, the mobility management network element 1000 is presented in a form of a functional unit. The "unit" herein may be an application-specific integrated circuit (ASIC), a circuit, a processor and a memory that execute one or more software or firmware programs, an integrated logic circuit, and/or another component that can provide the foregoing functions. In a simple embodiment, a person skilled in the art may figure out that the mobility management network element 1000 may be in a form shown in FIG. 4. The receiving unit 1100 and the processing unit 1200 may be implemented by using the processor and the memory in FIG. 4. Specifically, the processor executes a computer program stored in the memory to implement the mobility management network element 1000.

Figure 13:
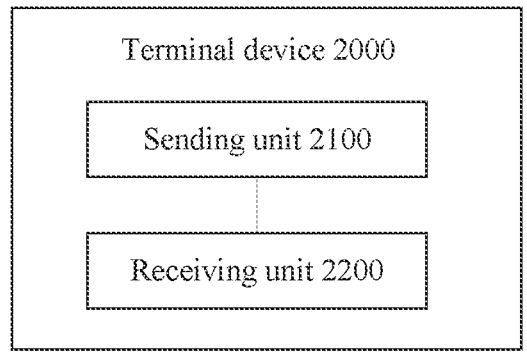
FIG. 13 shows a schematic block diagram of a terminal device according to another embodiment of the present disclosure.

FIG. 13 shows a schematic block diagram of a terminal device 2000 according to another embodiment of the present disclosure. As shown in FIG. 13, the terminal device 2000 includes:

a sending unit 2100, configured to send a non-combined registration request to a mobility management network element in packet switched PS domain, where the non-combined registration request is used to implement registration of the terminal device with a PS domain, and the non-combined registration request carries SMS only indication information: and a receiving unit 2200, configured to receive first indication information sent by the mobility management network element in the PS domain, where the first indication information is used to indicate that the mobility management network element does not support SMS transfer without combined procedure, and the first indication information is sent to the terminal device when the mobility management network element in the PS domain determines, after receiving the non-combined registration request sent by the terminal device, that the mobility management network element in the PS domain does not support SMS transfer without combined procedure.

The SMS only indication information herein is used to indicate that the terminal device requests to obtain an SMS service. In other words, the SMS only indication information is used to indicate that the terminal device needs to transfer an SMS.

The terminal device 2000 provided in this embodiment of the present disclosure may be corresponding to the terminal device described in the method 400. In addition, the modules or units in the terminal device 2000 are respectively configured to perform the actions or the processing processes performed by the terminal device in the method 400. For brevity, details are not described herein.

It should be understood that in this embodiment, the terminal device 2000 is presented in a form of a functional unit. The "unit" herein may be an application-specific integrated circuit (ASIC), a circuit, a processor and a memory that execute one or more software or firmware programs, an integrated logic circuit, and/or another component that can provide the foregoing functions. In a simple embodiment, a person skilled in the art may figure out that the terminal device 2000 may be in a form shown in FIG. 4. The sending unit 2100 and the receiving unit 2200 may be implemented by using the processor and the memory in FIG. 4. Specifically, the processor executes a computer program stored in the memory to implement the terminal device 2000.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A short message service (SMS) processing method in an Internet of Things, wherein the method comprises:
   sending, by a terminal device, a first non-combined registration request to a mobility management network element in a packet switched (PS) domain, wherein the first non-combined registration request carries SMS only indication information; and
   receiving, by the terminal device from the mobility management network element in the PS domain, an attach accept message or a location update accept message, wherein the attach accept message or the location update accept message comprises first indication information, wherein the first indication information is used to indicate that the mobility management network element in the PS domain cannot provide an SMS service for the terminal device, and wherein the attach accept message or the location update accept message is sent to the terminal device after the mobility management network element in the PS domain determines, after receiving the first non-combined registration request sent by the terminal device, that the mobility management network element in the PS domain cannot transfer an SMS for the terminal device through the PS domain and a mobility management network element in a circuit switched (CS) domain rejects registration of the terminal device with the CS domain.

2. The method according to claim 1, wherein the method further comprises:
   starting, by the terminal device, a timer, and resending a second non-combined registration request to the mobility management network element in the PS domain when the timer expires, wherein the second non-combined registration request carries the SMS only indication information.

3. The method according to claim 2, wherein the second non-combined registration request is a non-combined attach request or a non-combined Tracking Area Update request.

4. The method according to claim 1, wherein the method further comprises:
   sending, by the terminal device, a combined registration request to the mobility management network element in the PS domain, wherein the combined registration request carries the SMS only indication information.

5. The method according to claim 1, wherein the first non-combined registration request is a non-combined attach request or a non-combined Tracking Area Update request.

6. The method according to claim 1, wherein the mobility management network element in the PS domain is Mobility Management Entity.

7. The method according to claim 1, wherein the mobility management network element in the CS domain is Mobile-services Switching Centre or Visitors Location Register.

8. The method according to claim 1, wherein the attach accept message carries attach result information, the attach result information is "EPS only", and the "EPS only" indicates that the terminal device successfully registers with only the PS domain.

9. The method according to claim 1, wherein receiving the attach accept message or the location update accept message comprises receiving the location update accept message, the location update accept message carries update result information, the location update result information is "tracking area updating", and the "tracking area updating" indicates that the terminal device successfully completes a location update to the PS domain.

10. A terminal device, comprising at least one processor and a non-transitory computer readable medium having a plurality of computer readable instructions stored thereon that, when executed by the at least one processor, cause the at least one processor to:
    send a first non-combined registration request to a mobility management network element in a packet switched (PS) domain, wherein the first non-combined registration request carries short message service (SMS) only indication information; and
    receive, from the mobility management network element in the PS domain, an attach accept message or a location update accept message, wherein the attach accept message or the location update accept message comprises first indication information, wherein the first indication information is used to indicate that the mobility management network element in the PS domain cannot provide an SMS service for the terminal device, wherein and the attach accept message or the location update accept message is sent to the terminal device after the mobility management network element in the PS domain determines, after receiving the first non- combined registration request sent by the terminal device, that the mobility management network element in the PS domain cannot transfer an SMS for the terminal device through the PS domain and a mobility management network element in a circuit switched (CS) domain rejects registration of the terminal device with the CS domain.

11. The terminal device according to claim 10, wherein the instructions, when executed by the at least one processor, cause the at least one processor to:
    start a timer, and resend a second non-combined registration request to the mobility management network element in the PS domain when the timer expires, wherein the second non-combined registration request carries the SMS only indication information.

12. The terminal device according to claim 11, wherein the second non-combined registration request is a non-combined attach request or a non-combined Tracking Area Update request.

13. The terminal device according to claim 10, wherein the instructions, when executed by the at least one processor, cause the at least one processor to:
    send a combined registration request to the mobility management network element in the PS domain, wherein the combined registration request carries the SMS only indication information.

14. The terminal device according to claim 10, wherein the first non-combined registration request is a non-combined attach request or a non-combined Tracking Area Update request.

15. The terminal device according to claim 10, wherein the mobility management network element in the PS domain is Mobility Management Entity.

16. The terminal device according to claim 10, wherein the mobility management network element in the CS domain is Mobile-services Switching Centre or Visitors Location Register.

17. The terminal device according to claim 10, wherein the attach accept message carries attach result information, the attach result information is "EPS only", and the "EPS only" indicates that the terminal device successfully registers with only the PS domain.

18. The terminal device according to claim 10, wherein receiving the attach accept message or the location update accept message comprises receiving the location update accept message, the location update accept message carries update result information, the location update result information is "tracking area updating", and the "tracking area updating" indicates that the terminal device successfully completes a location update to the PS domain.

19. A non-transitory computer-readable medium storing computer instructions which, when executed by one or more processors, cause the one or more processors to perform operations comprising:

sending a first non-combined registration request to a mobility management network element in a packet switched (PS) domain, wherein the first non-combined registration request carries SMS only indication information; and receiving, from the mobility management network element in the PS domain, an attach accept message or a location update accept message, wherein the attach accept message or the location update accept message comprises first indication information, wherein the first indication information is used to indicate that the mobility management network element in the PS domain cannot provide an SMS service for a terminal device, and wherein the attach accept message or the location update accept message is sent to the terminal device after the mobility management network element in the PS domain determines, after receiving the first non-combined registration request sent by the terminal device, that the mobility management network element in the PS domain cannot transfer an SMS for the terminal device through the PS domain and a mobility management network element in a circuit switched (CS) domain rejects registration of the terminal device with the CS domain.

* * * * *